(12) United States Patent
Miyahara et al.

(10) Patent No.: US 8,708,116 B2
(45) Date of Patent: Apr. 29, 2014

(54) VIBRATION DAMPING DEVICE

(75) Inventors: Yu Miyahara, Susono (JP); Hiroyuki Amano, Susono (JP); Shinichiro Suenaga, Susono (JP); Shingo Aijima, Susono (JP)

(73) Assignee: Toyota Jidosha Kabushiki Kaisha, Aichi (JP)

( * ) Notice: Subject to any disclaimer, the term of this patent is extended or adjusted under 35 U.S.C. 154(b) by 0 days.

(21) Appl. No.: 13/119,357

(22) PCT Filed: Oct. 15, 2010

(86) PCT No.: PCT/JP2010/068109
§ 371 (c)(1),
(2), (4) Date: Nov. 7, 2011

(87) PCT Pub. No.: WO2012/049762
PCT Pub. Date: Apr. 19, 2012

(65) Prior Publication Data
US 2013/0186724 A1    Jul. 25, 2013

(51) Int. Cl.
*F16H 45/02* (2006.01)
*F16F 15/14* (2006.01)

(52) U.S. Cl.
USPC ............... 192/3.29; 192/55.61; 74/574.2

(58) Field of Classification Search
None
See application file for complete search history.

(56) References Cited

U.S. PATENT DOCUMENTS

| | | | |
|---|---|---|---|
| 5,713,442 A | 2/1998 | Murata et al. | |
| 6,006,879 A * | 12/1999 | Sudau | 192/3.29 |
| 6,374,698 B1 * | 4/2002 | Carlson et al. | 74/570.2 |
| 6,382,050 B1 * | 5/2002 | Carlson et al. | 74/570.2 |
| 8,479,901 B2 * | 7/2013 | Engelmann et al. | 192/3.28 |
| 2009/0156317 A1 * | 6/2009 | Degler et al. | 464/81 |
| 2012/0180473 A1 * | 7/2012 | Huegel et al. | 60/435 |

FOREIGN PATENT DOCUMENTS

| | | |
|---|---|---|
| JP | 7-280037 A | 10/1995 |
| JP | 9-264399 A | 10/1997 |
| JP | 10-274284 A | 10/1998 |
| JP | 11-311309 A | 11/1999 |
| JP | 2000-297843 A | 10/2000 |

\* cited by examiner

*Primary Examiner* — David D Le
*Assistant Examiner* — Huan Le
(74) *Attorney, Agent, or Firm* — Sughrue Mion, PLLC (57) ABSTRACT

To provide a simply-structured vibration damping device having excellent vibration damping capacity.

A vibration damping device is configured to damp torsional vibrations of a rotary member of a hydraulic transmission 1, in which the rotary member is rotated integrally with a drive side impeller 2 or with a driven side impeller 5, and in which the drive side impeller 2 and the driven side impeller 5 are connected with a lockup clutch 26 actuated by fluid pressure. The vibration damping device comprises: a holding chamber 24 rotated integrally with the driven side impeller 5; a rolling member 25 held in the holding chamber 24, which is rotated in a rotational direction of the driven side impeller 5 but allowed to rotate relatively with the driven side impeller 5; and a movable member 23 configured to lock the rolling member 25 in the holding chamber 24 when actuated by the fluid pressure for disengaging the lockup clutch 26, and to unlock the rolling member 25 in the holding chamber 24 when actuated by the fluid pressure for engaging the lockup clutch 26.

8 Claims, 4 Drawing Sheets

VIBRATION DAMPING DEVICE

CROSS REFERENCE TO RELATED APPLICATION

This application is a National Stage of International Application No. PCT/JP2010/068109 filed Oct. 15, 2010, the contents of all of which are incorporated herein by reference in their entirety.

TECHNICAL FIELD

This invention relates to a vibration damping device for damping torsional vibrations, and especially to a vibration damping device comprising a rotary member rotated by torque and a rolling member held in the rotary member while being allowed to rotate relatively with the rotary member.

BACKGROUND ART

A rotary member such as a drive shaft, gear and so on used to transmit a torque from a prime mover to a desired portion or a member is vibrated inevitably by a fluctuation of the torque or load, or by a friction. A frequency of the vibration is varied according to rotational speed, and high order vibrations such as secondary vibrations are also generated. Therefore, amplitude of vibrations is widened by resonance. As a result, noise is generated and durability of the rotary member is degraded. Examples of a device or mechanism for suppressing such vibrations of equipment for transmitting power by rotation is disclosed in Japanese Patent Laid-Open No. 7-280037 and Japanese Patent Laid-Open No. 2000-97843.

A vibration absorber taught by Japanese Patent Laid-Open No. 7-280037 comprises a chamber formed on an outer circumferential portion of a rotary member such as a flywheel, and a rolling member such as a roller (or a skid) held in the chamber. According to the teachings of Japanese Patent Laid-Open No. 7-280037, when the rotary member is rotated, the rolling member rolls in the chamber while entering into resonance with torsional vibrations thereby absorbing the torsional vibrations dynamically. Meanwhile, a dynamic damper taught by Japanese Patent Laid-Open No. 2000-297843 comprises a rolling mass on which a diametrically larger elastomer is mounted, and a storing chamber holding the rolling mass therein which is formed on an outer circumferential portion of a hub. According to the teachings of Japanese Patent Laid-Open No. 2000-297843, in case a centrifugal force acting on the rolling mass is weak, that is, in case a rotational speed of the hub is low, the rolling mass is kept away from an inner face of the storing chamber by the elastomer. To the contrary, in case the rotational speed of the hub is increased and the centrifugal force is thereby increased, the elastomer is compressed by the rolling mass, and the rolling mass rolls along the inner face of the storing chamber while being contacted therewith.

Specifically, according to the vibration absorber taught by Japanese Patent Laid-Open No. 7-280037, a diameter of the rolling member held in the annular chamber is smaller than a radius of the annular chamber. In the annular chamber, a V-shaped guide member capable of opening widely is arranged at the center portion in a rotatable manner, and the rolling member is held between the guide member and the inner face of the annular chamber. Therefore, in case great torsional vibrations are generated, the rolling member is rotated together with the guide member thereby absorbing the vibrations. To the contrary, in case the rotational speed is low, the rolling member is held between the inner face of the chamber and the guide member. Therefore, generation of noise and micro vibrations can be prevented. However, according to the teachings of Japanese Patent Laid-Open No. 7-280037, a volume of the rolling member is rather small in comparison with a capacity of the chamber. In addition, it is difficult to situate the rolling member certainly at the outer circumferential side in the chamber. For these reasons, vibration damping capacity of the vibration absorber taught by Japanese Patent Laid-Open No. 7-280037 is insufficient. Moreover, according to the teachings of Japanese Patent Laid-Open No. 7-280037, it is necessary to arrange the guide member in the chamber in a rotatable manner. Therefore, a number of constructional elements has to be increased by additional members for arranging the guide member. Thus, the vibration absorber taught by Japanese Patent Laid-Open No. 7-280037 has to be improved to avoid those disadvantages.

As described, according to the dynamic damper taught by Japanese Patent Laid-Open No. 2000-297843, the elastomer is interposed between the rolling mass and the inner face of the storing chamber. Therefore, the torque is transmitted through the elastomer, and the vibration damping capacity is thereby degraded. Moreover, it is rather difficult to set elasticity of the elastomer to a value possible to hold the rolling member away from the inner face of the storing chamber in a low-speed region, and also possible to damp the vibrations of target frequency. Further, the elastomer will be deteriorated with age, and if the elastomer is deteriorated, noise would be generated and the vibration damping capacity would be changed.

DISCLOSURE OF THE INVENTION

The present invention has been conceived noting the technical problems thus far described, and its object is to provide a simply-structured vibration damping device having excellent vibration damping capacity, utilizing existing members and functions.

In order to achieve the above-mentioned object, according to the present invention, there is provided a vibration damping device for damping torsional vibrations of a rotary member of a hydraulic transmission, in which the rotary member is rotated integrally with a drive side impeller creating a flow of fluid or with a driven side impeller driven by the created flow of the fluid, and in which the drive side impeller and the driven side impeller are connected with a lockup clutch actuated by fluid pressure. The vibration damping device characterized by comprising: a holding chamber, which is rotated integrally with the driven side impeller; a rolling member held in the holding chamber, which is rotated in a rotational direction of the driven side impeller but allowed to rotate relatively with the driven side impeller; and a movable member, which is configured to lock the rolling member in the holding chamber when actuated by the fluid pressure for disengaging the lockup clutch, and to unlock the rolling member in the holding chamber when actuated by the fluid pressure for engaging the lockup clutch.

According to the present invention, the lockup clutch is arranged in the hydraulic transmission in a manner to reciprocate along a common rotational axis of the drive side impeller and the driven side impeller. In addition, a housing in which the holding chamber is formed is arranged to be opposed to the lockup clutch, and to be rotated integrally with the driven side impeller. The aforementioned movable member forms a side face of the holding chamber being opposed to the lockup clutch while being connected therewith.

More specifically, the drive side impeller and the driven side impeller are arranged coaxially while being opposed to each other, and a covering member covering the driven side impeller from an outer circumferential side is connected integrally with the drive side impeller. The aforementioned lockup clutch is arranged between the driven side impeller and the covering member coaxially with the driven side impeller while being opposed to an inner face of the covering member. The housing is arranged between the driven side impeller and the lockup clutch, and the housing is also arranged coaxially with the driven side impeller and the lockup clutch. According to the vibration damping device thus structured, the movable member is moved together with the lockup clutch toward the inner face of the covering member thereby unlocking the rolling member, in case the lockup clutch is being pushed onto the inner face of the covering member to be engaged therewith by the fluid pressure.

According to another aspect of the present invention, the drive side impeller and the driven side impeller are also arranged coaxially while being opposed to each other, and a covering member covering the driven side impeller from an outer circumferential side is also connected integrally with the drive side impeller. In addition, the lockup clutch is also arranged between the driven side impeller and the covering member coaxially with the driven side impeller while being opposed to an inner face of the covering member. However, the housing in which the holding chamber is formed is arranged in the covering member in a manner to rotate integrally with the driven side impeller, and the movable member forms a side face of the holding chamber. In this case, the movable member is moved in a direction to unlock the rolling member by the fluid pressure pushing the lockup clutch onto the inner face of the covering member thereby engaging the lockup clutch with the covering member.

In addition, according to the vibration damping device of the present invention, a surface of the movable member for pushing the rolling member is formed of high frictional member.

According to the present invention, in case a speed inputted to the hydraulic transmission is comparatively low, or in case a torque inputted to the hydraulic transmission is comparatively large, the lockup clutch is disengaged for the purpose of damping vibrations by a buffering action of the fluid. In this situation, the movable member is actuated by the fluid pressure for disengaging the lockup clutch, and the rolling member is locked by the movable member thus actuated. As a result, the rolling member locked in the holding chamber is restricted to move freely. Therefore, the rolling member will not collide against the inner face of the holding chamber so that the noise resulting from such collision can be prevented or suppressed. For this purpose, the movable member is frictionally contacted with the rolling member, therefore, the rolling member can be locked certainly.

To the contrary, the lockup clutch is engaged in case the speed inputted to the hydraulic transmission is increased, or in case the torque inputted to the hydraulic transmission is reduced. In this case, the movable member is actuated by the fluid pressure for engaging the lockup clutch in the direction to unlock the rolling member. As a result, the rolling member is allowed to move freely in the holding chamber. Therefore, even if torsional vibrations are generated on the driven side impeller or the member integrated therewith, the rolling member is moved relatively in the holding chamber and the torsional vibrations are absorbed and damped by such relative displacement of the rolling member. That is, in case the rotational speed is increased, the vibration damping device functions to damp the vibrations. Thus, according to the present invention, the holding chamber is formed partially by the movable member, and the movable member is actuated to lock and unlock the rolling member by the fluid pressure for engaging and disengaging the lockup clutch. Therefore, the vibration damping device of the present invention can be formed by merely modifying the structure of the holding chamber without using additional members. Thus, the structure of the vibration damping device of the present invention is simple, but the vibration damping capacity thereof is excellent.

BEST MODE FOR CARRYING OUT THE INVENTION

Next, this invention will be explained in more detail. The vibration damping device according to the present invention is a pendulum type vibration damping device. Specifically, according to the vibration damping device of the present invention, rolling members are held in a rotary member rotated by a torque, and each of the rolling members functioning as a weight is allowed to move relatively and freely in the rotary member. According to the present invention, the vibration damping device thus structured is arranged in a hydraulic transmission having a lock-up clutch, and the rolling members are locked and unlocked utilizing pressure for engaging and disengaging the lock-up clutch.

Figure 1:
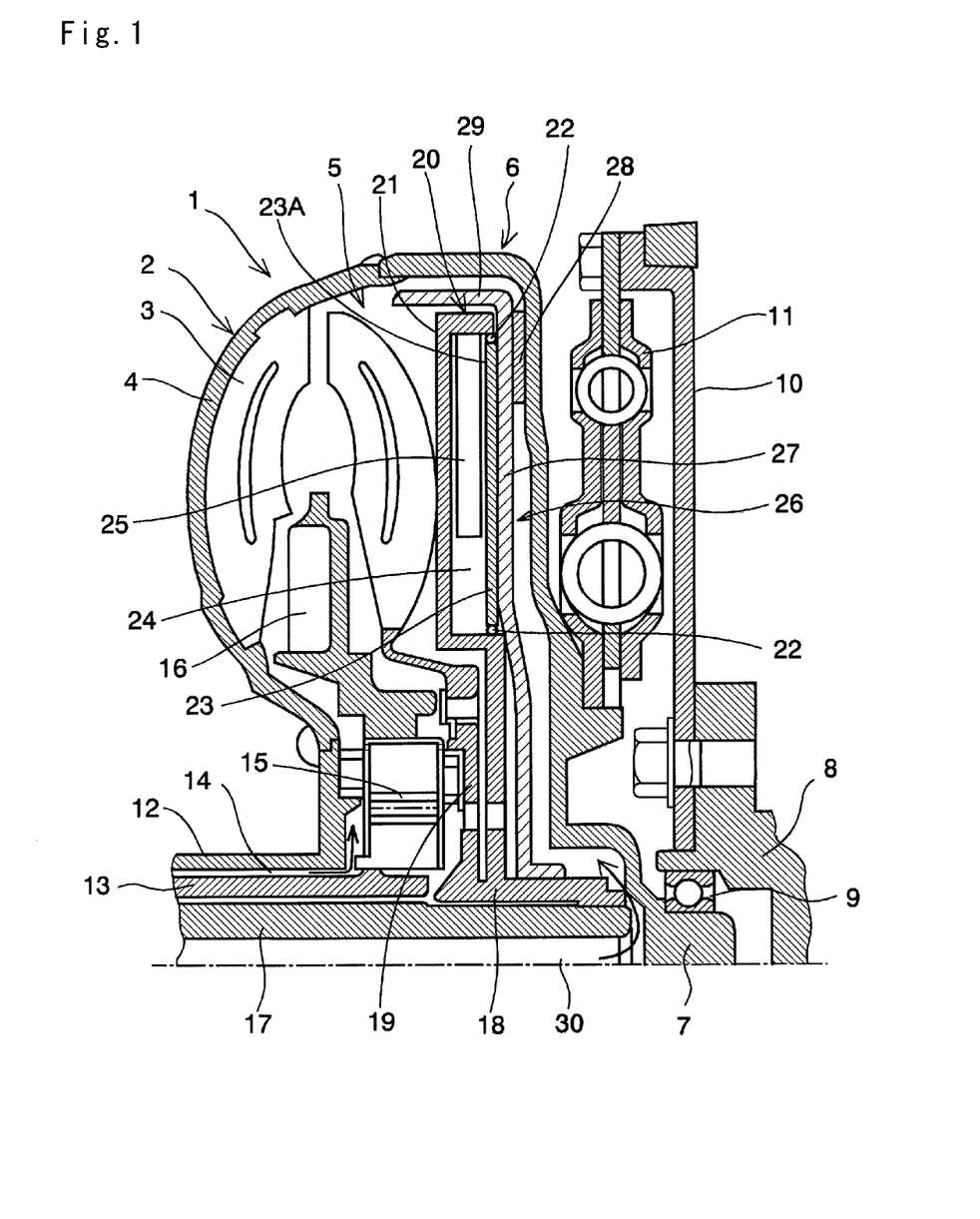
FIG. 1 is a partial sectional view showing upper half of one example of the vibration damping device of the present invention above a rotational center axis.

FIG. 1 is a view showing an example in which the vibration damping device is arranged in a torque converter 1 as a hydraulic transmission capable of amplifying torque. The torque converter 1 shown therein is structured as a conventional torque converter widely used in vehicles. Specifically, a plurality of pump blade 3 is arranged in a circular pattern on an inner face of a pump shell 4 of a pump impeller 2 as an input member, and a turbine runner 5 is arranged to be opposed the pump impeller 2. A configuration of the turbine runner 5 is substantially symmetrically with that of the pump impeller 2, and a plurality of turbine blade is arranged in a circular pattern on an inner face of an annular (or semicircular) shell. Thus, the pump impeller 2 and the turbine runner 5 are arranged coaxially while being opposed to each other.

A front cover 6 covering the turbine runner 5 from outside is joined integrally with an outer circumferential end of the pump shell 4. As shown in FIG. 1, the front cover 6 is a bottomed-cylindrical member comprising a front wall facing to the inner face of the pump shell 4, and a shaft portion 7 protrudes from a center of an outer face of the front wall. The shaft portion 7 is inserted into a crank shaft 8 of an engine (not shown) through a bearing 9 so that the shaft portion 7 can be rotated relatively with the crank shaft 8. In addition, a drive plate 10 is attached to the crank shaft 8, and the drive plate 10 is connected with the front cover 6 through a damper 11.

A cylindrical shaft 12 is joined integrally with an inner circumferential end of the pump shell 4. The cylindrical shaft 12 extends toward a back side (i.e., toward an opposite side of the engine), and connected with an oil pump (not shown). In addition, a fixed shaft 13 is inserted into the cylindrical shaft 12. Specifically, an outer diameter of the fixed shaft 13 is smaller than an inner diameter of the cylindrical shaft 12, and a leading end portion of the fixed shaft 13 is inserted into an inner space of the torque converter 1 enclosed by the pump shell 4 and the front cover 4. The fixed shaft 13 is also a hollow shaft formed integrally with a not shown fixing wall holding an oil pump, and a space between an outer circumferential face of the fixed shaft 13 and an inner circumferential face of the cylindrical shaft 12 serves as a flow path (i.e., an oil passage) 14.

More specifically, the leading end portion of the fixed shaft 13 is situated at an inner circumferential side of the turbine runner 5 between the pump impeller 2 and the turbine runner 5, and splined to an inner race of a one-way clutch 15. In addition, a stator 16 is arranged between an inner circumferential portion of the pump impeller 2 and an inner circumferential portion of the turbine runner 5, and the stator 16 is fitted onto an outer race of the one-way clutch 15. Therefore, in case a ratio between a speed of the pump impeller 2 and a speed of the turbine runner 5 is small, the stator 16 can be stopped to be rotated by the one-way clutch 15 even if the oil flowing out of the turbine runner 5 acts on the stator 16. As a result, a flowing direction of the oil is changed to a direction to feed the oil to the pump impeller 2. To the contrary, in case the ratio between the speed of the pump impeller 2 and the speed of the turbine runner 5 becomes large, the oil is poured to a back face of the stator 16. In this situation, therefore, the stator 16 is rotated in order not to disturb the flow of the oil.

An output shaft 17 (i.e., an input shaft of not shown transmission) is inserted into the fixed shaft 13 in a rotatable manner. A leading end portion of the output shaft 17 protrudes from the leading end of the fixed shaft 13 to near the inner face of the front cover 6, and the protruding portion of the output shaft 17 is splined to a hub shaft 18. On the hub shaft 18, a flange-shaped hub 19 is formed to protrude outwardly to be connected integrally with the turbine runner 5.

In addition, a damper housing 20 is also formed integrally on the hub shaft 18. The damper housing 20 is one of the constructional elements of the vibration damping device of the present invention. Specifically, the damper housing 20 comprises: an annular hollow portion formed behind the turbine runner 5 (in the front cover 6 side); and a flange portion connecting the hollow portion with the hub shaft 18. The hollow portion is formed by a main body 21 opening to the front cover 6 side and a lid 23 closing the main body 21 in a slidable manner, and as shown in FIG. 1, an axial section of the hollow portion is a shallow rectangular. In addition, a sealing member 22 is interposed between an opening end of the main body 21 and the lid 23 so that the hollow portion is closed air-tightly. Accordingly, the damper housing 20 and a member to be rotated integrally with the damper housing 20 serves as the rotary member of the present invention.

Figure 2:
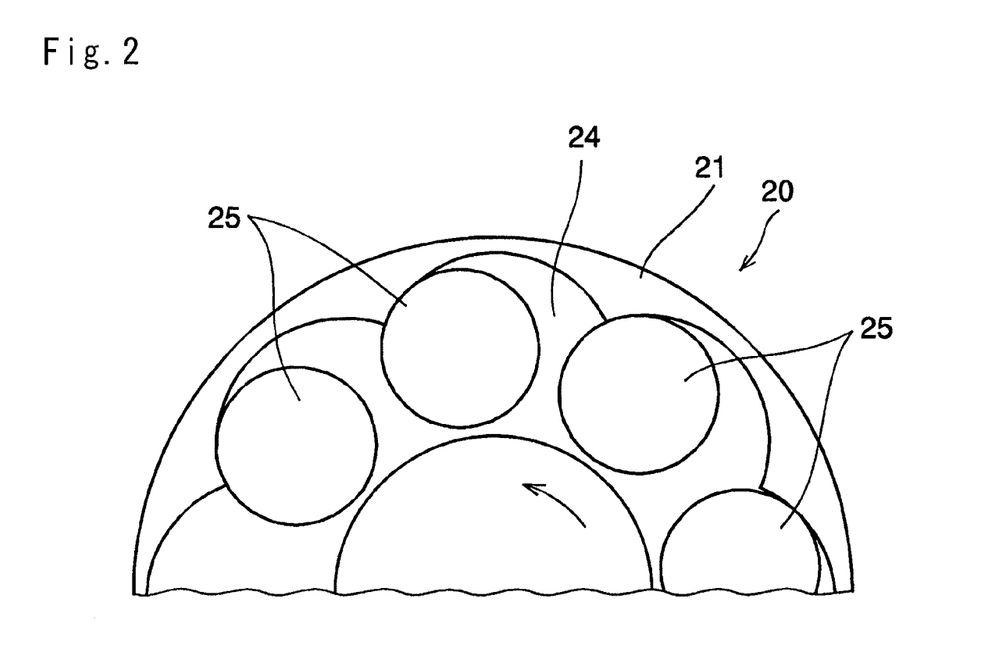
FIG. 2 is a view showing an example of configuration of the holding chamber.

An inner shape of the hollow portion is shown in FIG. 2. As shown in FIG. 2, arcuate depressions are formed all round an outer circumferential face of the hollow portion, and an inner circumferential face of the hollow portion is a true circular face. Therefore, a radial distance between the inner circumferential face and the outer circumferential face is varied continuously in a circumferential direction. Each space between the portions of the outer circumferential face closest to the inner circumferential face serves as a holding chamber 24 for holding a rolling member 25, and the rolling member 25 held therein is rotated in a rotational direction of the turbine runner 5. For example, the rolling member 25 is a disc-shaped weight. Specifically, an outer diameter of the rolling member 25 is shorter than the maximum distance between the outer circumferential face and the inner circumferential face of the hollow portion forming the holding chamber 24, but longer than the shortest distance between the outer circumferential face and the circumferential inner face. Therefore, the rolling member 25 is allowed to roll in a lateral direction of FIG. 2 within the holding chamber 24. That is, a toroidal face extends toward either sides of the deepest portion of the depression on the outer circumferential face of the hollow portion. Therefore, the rolling member 25 rolls along the toroidal face thus formed when contacted centrifugally therewith.

The lid 23 serves as the movable member of the present invention. Specifically, in case the lid 23 is moved toward an opening end side of the hollow portion, the lid 23 is isolated from the rolling member 25. To the contrary, in case the lid 23 is pushed into the hollow portion, the rolling member 25 is clamped between the lid 23 and a bottom face of the hollow portion. In order to lock the rolling member 25 certainly, a friction of an inner face (i.e., a left face in FIG. 1) 23A is increased by harshening, by forming a nonslip film etc.

A lockup clutch 26 is interposed between the damper housing 20 and the front cover 6. The lockup clutch 26 is a conventional lockup clutch adapted to transmit a torque between a driving member and a driven member without involving fluid, and in the example shown in FIG. 1, the lockup clutch 26 is used to connect the hub shaft 18 and the front cover 6. Specifically, the lockup clutch 26 is composed mainly of a disc-shaped lockup piston 27 interposed between the aforementioned vibration damping device and the inner face of the front cover 6, and splined to the hub shaft 18 in a manner to move along an axial direction freely but to rotate integrally with the hub shaft 18. On a face of the lockup piston 27 opposed to the front cover 6, a frictional member 28 is attached to the outermost portion. Therefore, when the frictional member 28 is pushed onto the front cover 6, a friction is developed therebetween. An outer diameter of the lockup piston 27 is slightly smaller than that of the front cover 6, and a cylindrical portion 29 extends from an outer circumferential end of the lockup piston 27 in an axial direction along an inner face of the front cover 6. Therefore, in case the lockup piston 27 is pushed to the right side of FIG. 1, the frictional member 28 is contacted to be engaged with the front cover 6, and in this situation, the torque is allowed to be transmitted between the front cover 6 and the hub shaft 18. To the contrary, in case the lockup piston 27 is pushed back to the left side of FIG. 1, the frictional member 28 is isolated and disengaged from the front cover 6, and in this situation, the transmission of the torque between the front cover 6 and the hub shaft 18 is interrupted.

The aforementioned lid 23 functioning as the movable member is connected with a back face of the lockup piston 27 (i.e., with a face opposite to the face to which the frictional member 28 is attached). Therefore, the lid 23 is reciprocated axially together with the lockup piston 27.

Next, here will be explained an oil passage for feeding and discharging oil pressure for engaging and disengaging the lockup clutch 26. In the aforementioned output shaft 17, an oil passage 30 is formed along a center axis thereof, and the oil passage 30 is opened to a leading end side of the output shaft 17. Specifically, as shown in FIG. 1, a narrow clearance is left between the inner face of the front cover 6 and the lockup piston 27, and the oil passage 30 is opened to the aforementioned clearance to be communicated therewith. In addition, an oil passage 14 is formed between the cylindrical shaft 12 and the fixed shaft 13, and the oil passage 14 is communicated with a space behind the lockup piston 27 (i.e., with a space holding the turbine runner 5).

Therefore, in case of engaging the lockup clutch 26 with the front cover 6, an oil pressure in the oil passage 14 is raised higher than that in the oil passage 30 formed in the output shaft 17. As a result, the oil pressure in the space behind the lockup piston 27 becomes higher than the oil pressure between the lockup piston 27 and the front cover 6, and the frictional member 28 attached to the lockup piston 27 is thereby pushed onto the front cover 6. The lockup clutch 26 is thus engaged with the front cover 6. In case the lockup piston 27 is thus moved toward the front cover 6, the lid 23 of the vibration damping device is also moved toward the right side in FIG. 1 so that the rolling member 25 being clamped is released. To the contrary, in case the oil pressure in the oil passage 14 is reduced lower than that in the oil passage 30, the oil pressure between the lockup piston 27 and the front cover 6 becomes higher than the oil pressure in the space behind the lockup piston 27. As a result, the lockup piston 27 is pushed away from the front cover 6 and the frictional member 28 is thereby isolated from the inner face of the front cover 6. That is, the lockup clutch 26 is disengaged from the front cover 6. In case the lockup piston 27 is thus moved away from the front cover 6, the lid 23 of the vibration damping device is also moved toward the left side in FIG. 1. Therefore, the rolling member 25 is clamped immovably between the main body 21 and the lid 23. Provided that the torque converter 1 is mounted on a vehicle, the lockup clutch 26 is engaged and disengaged by a conventional control usually carried out in the vehicles. Specifically, the lockup clutch 26 is engaged and disengaged by controlling the oil pressures in the oil passages 14 and 30, in other words, by feeding and discharging the oil to/from the oil passages 14 and 30 with reference to a map for engaging the lockup clutch 26. For this purpose, specifically, a region of parameters representing running condition of the vehicle, that is, a range of a vehicle speed, an opening degree of an accelerator and so on where the lockup clutch 26 is engaged is defined in the map.

Next, here will be explained actions of the torque converter 1 and vibration damping device on the assumption that the torque converter 1 is mounted on a vehicle. For example, in case the vehicle is stopping so that a rotational speed of an engine is low, or in case an output torque of the engine or an opening degree of the accelerator is large, the lockup clutch 26 is disengaged to reduce vibrations of the vehicle and a booming noise. In those cases, specifically, the oil pressure fed from the oil passage 30 to the clearance between the lockup piston 27 and the front cover 6 is raised to be higher than the oil pressure in the space behind the lockup piston 27 where the turbine runner 5 is situated. As a result, the lockup piston 27 is pushed away from the front cover 6. Therefore, the frictional member 28 attached to the lockup piston 27 is detached from the inner face of the front cover 6, and a torque transmission therebetween is disconnected. That is, the lockup clutch 26 is disengaged.

In case the lockup piston 27 is thus pushed away from the inner face of the front cover 6, the lid 23 contacted with the back face of the lockup piston 27 is pushed into holding chamber 24. In this situation, a width of the holding chamber 24 (that is, a depth of the hollow portion) is reduced gradually, and the rolling member 25 is eventually clamped between the lid 23 and the inner face of the holding chamber 24.

In the torque converter 1, the torque of the engine is transmitted to the front cover 6 through the drive plate 10. Therefore, the pump impeller 2 is rotated together with the front cover 6 thereby creating a spiral flow of the oil. The oil thus flowing spirally migrates toward the turbine runner 5 from the outer circumferential side of the pump blade 3, and the turbine runner 5 is rotated by a kinetic energy of the oil. The power is thus transmitted from the pump impeller 2 of the driving side to the turbine runner 5 of the driven side. As described, the turbine runner 5 is integrated with the dumper housing 20 through the hub shaft 18. Therefore, the power thus transmitted to the turbine runner 5 is further transmitted to the output shaft 17 to be outputted from the output shaft 17, and the dumper housing 20 is rotated together with the turbine runner 5. In this situation, the rolling member 25 in the holding camber 24 is clamped between the inner face of the holding chamber 24. Therefore, even if the rotational speed of the damper housing 20 is varied by a some kind of factor such as a fluctuation of the torque, the rolling member 25 held in the holding chamber 24 will not collide against the inner face of the holding chamber 24. For this reason, a noise resulting from such collision of the rolling member 25 against the inner face of the holding chamber 24 can be prevented or reduced.

In case the speed of the vehicle on which the torque converter 1 is mounted is increased so that the engine speed or the speed inputted to the torque converter 1 is increased, a transmission efficiency of the torque has to be improved rather than amplifying the torque by the torque converter 1. For this purpose, the lockup clutch 26 is engaged in this case. Specifically, the oil pressure fed from the oil passage 14 to the space behind the lockup clutch 27 is raised, or otherwise, the oil pressure in the oil passage 30 is lowered. As a result, the oil pressure in the space behind the lockup piston 27 where the turbine runner 5 is situated becomes higher than the oil pressure between the lockup piston 27 and the front cover 6, and the lockup piston 27 is thereby pushed toward the front cover 6. Therefore, the frictional member 28 attached to the surface of the lockup piston 27 to be opposed to the front cover 6 is pushed onto the inner face of the front cover 6. Consequently, the lockup clutch 26 is engaged with the front cover 6 so that the torque is allowed to be transmitted frictionally between the frictional member 28 and the front cover 6. As described, the lockup piston 27 is splined to the hub shaft 18 and the turbine runner 5 is attached to the hub shaft 18. Therefore, in this situation, the power is transmitted directly from the front cover 6 to the turbine runner 5 or the output 17 thorough the lockup clutch 26. That is, the power is transmitted without involvement of fluid so that the slippage will not be caused by the fluid. For this reason, power transmission efficiency can be improved.

Under the situation where the lockup clutch 26 is thus engaged, the lid 23 is moved toward the right side in FIG. 1 together with the lockup clutch 27, in other words, in the direction to increase the width or a capacity of the holding chamber 24. In this situation, the load pushing the rolling member 25 onto the inner face of the holding chamber 24 is no longer applied to the rolling member 25. That is, the rolling member 25 being clamped is unlocked. Therefore, even if the turbine runner 5 or the damper housing 20 integrated therewith is shaken in the rotational direction by torsional vibrations, the rolling member 25 moves relatively therewith in the holding chamber 24 after a delay with respect to the rotational movement of the damper housing 20. As a result, the torsional vibrations are damped by such relative movement of the rolling member 25.

Thus, under the low-speed region where vibration damping effect is not highly demanded, the rolling member 25 is locked in the holding chamber 24. Therefore, the noise can be reduced or suppressed in the low-speed region. Meanwhile, in case the rotational speed is increased and the demand for damping the vibrations is therefore increased, the rolling member 25 being locked is unlocked by the oil pressure for engaging the lockup clutch 26 so that the vibrations can be damped by the action of the rolling member 25. As described, in the example shown in FIG. 1, the holding chamber 24 is sealed air-tightly by the sealing member 22, and a pressure of the air contained therein is substantially equal to an atmospheric pressure. Therefore, in case the lid 23 is pushed into the holding chamber 24, an internal pressure in the holding chamber has to be raised. However, the oil pressure for disengaging the lockup clutch 26 is higher than the internal air pressure in the holding chamber 24 so that the rolling member 25 can be clamped in the holding chamber 24 without difficulty. In addition, according to the example shown in FIGS. 1 and 2, the holding chamber 24 is partially formed by the lid 23 functioning as the movable member. Specifically, the rolling member 25 in the holding chamber 24 is locked and unlocked by moving the lid 23 by the fluid pressure for engaging and disengaging the lockup clutch 26. Therefore, the vibration damping device shown in FIGS. 1 and 2 can be formed by merely modifying the structure of the holding chamber 24 without using any extra elements. Thus, according to the example shown in FIGS. 1 and 2, the structure of the vibration damping device is very simple, and the vibration damping device thus structured has an excellent capacity for damping the vibrations.

Figure 3:
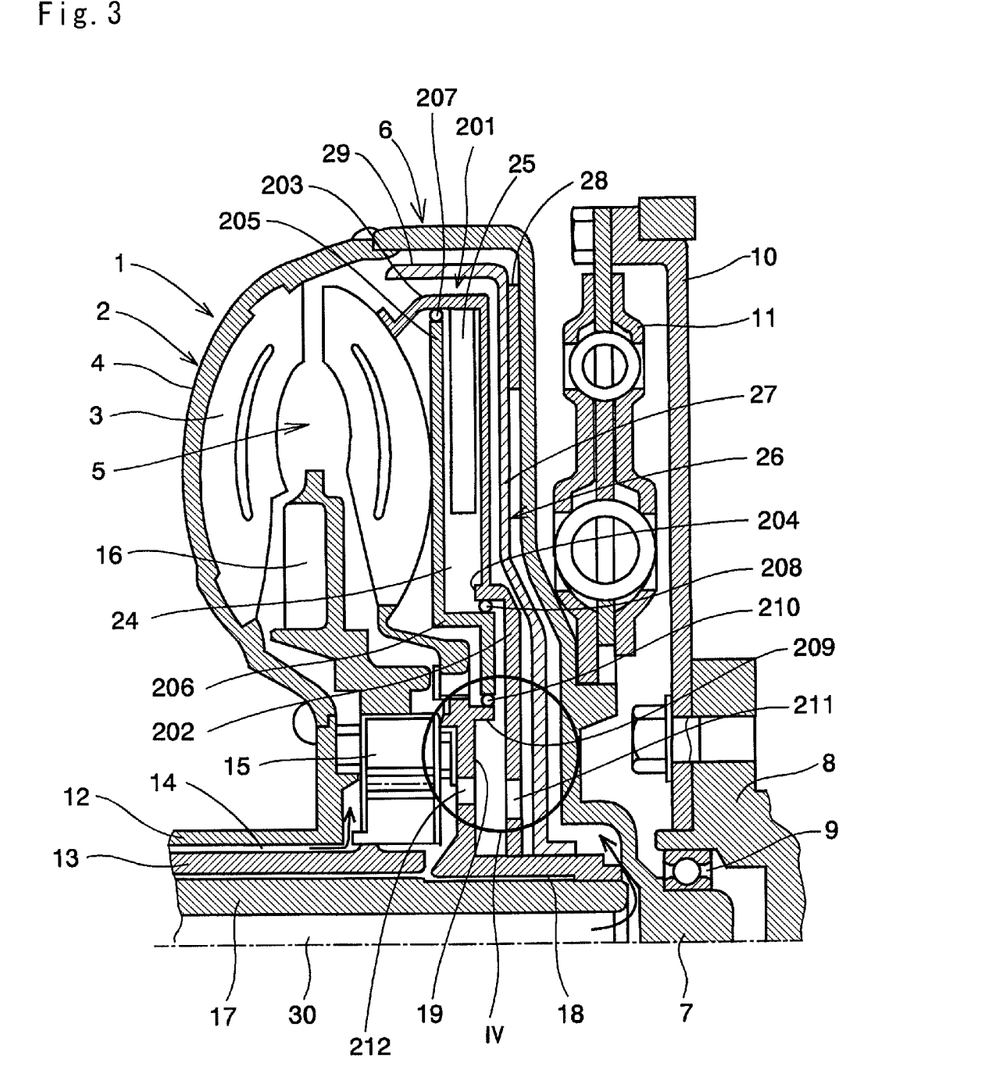
FIG. 3 is a partial sectional view showing upper half of another example of the vibration damping device of the present invention above a rotational center axis.
Figure 4:
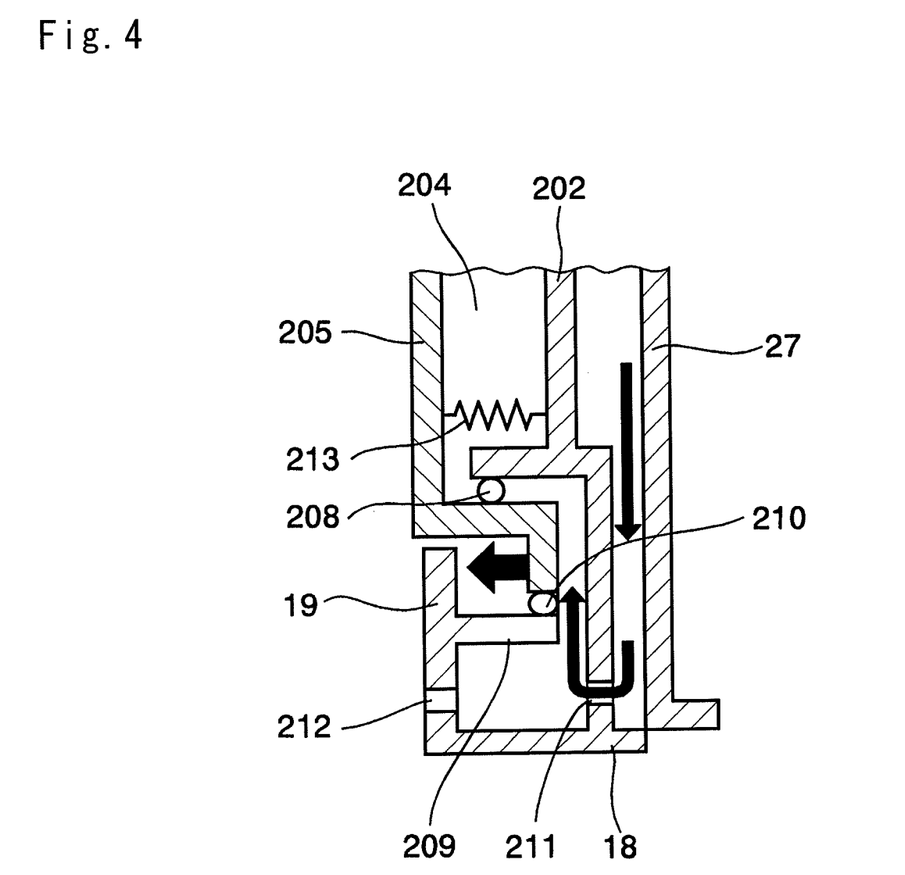
FIG. 4 is an enlarged view of a circle IV in FIG. 3.

In the example thus has been explained, the oil pressure for engaging and disengaging the lockup clutch 26 is applied to the lid 23 functioning as the movable member through the lockup piston 27. Alternatively, as shown in FIGS. 3 and 4, the vibration damping device of the present invention can be modified to apply the oil pressure for engaging and disengaging the lockup clutch 26 directly to the movable member. In FIGS. 3 and 4, detailed explanation about the elements in common with those in the example shown in FIGS. 1 and 2 is omitted by allotting common referential numerals. In the example shown in FIG. 3, a hollow portion defined air-tightly is formed behind the turbine runner 5 (that is, in a side opposite to a side where the turbine blade is attached), and the holding chamber 24, the rolling member 25 and the movable member are accommodated in the hollow portion. Specifically, a damper housing 201 is integrated with the hub shaft 18, and comprises a fixed side wall 202. The fixed side wall 202 extends radially outwardly along a back face of the lockup piston 27, and a cylindrical portion 203 is extended from an outer circumferential end thereof toward the turbine runner 5 to be contacted with a back face of the turbine runner 5. In addition, a boss 204 protrudes toward the turbine runner 5 from a radially intermediate portion of the fixed side wall 202. In the example shown in FIG. 3, a movable side wall 205 is opposed to the fixed side wall 202. Thus, in this example, the holding chamber 24 is formed by the fixed side wall 202, the cylindrical portion 203 and the movable side wall 205. Specifically, the movable side wall 205 is an annular plate member whose outer diameter is slightly smaller than an inner diameter of the cylindrical portion 203 of the fixed side wall 202, and whose inner diameter is slightly larger than an outer diameter of the hub 19. In order to form a cylindrical portion 206, the movable side wall 205 is bent at a portion slightly inner circumferential side of the boss 204.

An outer circumferential end of the movable side wall 205 is contacted with an inner circumferential face of the cylindrical portion 203 of the fixed side wall 202 through a sealing member 207 in a slidable manner, and the cylindrical portion 206 of the movable side wall 205 is contacted with an inner circumferential face of the boss 204 of the fixed side wall 202 through a sealing member 208 in a slidable manner. Thus, the holding chamber 24 formed between the fixed side wall 202 and the movable side wall 205 is sealed air-tightly by the sealing members 207 and 208. In addition, a boss 209 protrudes from the hub 19 toward the fixed side wall 202, and an inner circumferential end of the movable side wall 205 is contacted with an outer circumferential face of the boss 209 through a sealing member 210 in a slidable manner. Thus, the inner circumferential side of the movable side wall 205 is held by the boss 209. That is, a hollow space between the back face of the turbine runner 5 and the movable side wall 205 is sealed air-tightly by the sealing members 207 and 210, and a pressure of the air contained therein is substantially equal to an atmospheric pressure.

In this example, the above-explained movable side wall 205 functions as the movable member, and an oil passage is formed to apply a pressure to the movable side wall 205 thereby engaging the lockup clutch 26 with the front cover 6. For this purpose, a portion of the movable side wall 205 extending from the cylindrical portion 206 toward the inner circumferential side while being opposed to the fixed side wall 202 is exposed on the outside of the area sealed by the sealing members 207, 208 and 210. The portion of the movable side wall 205 thus exposed on the outside of the sealed space functions as a pressure receiving face, and in order to introduce oil pressure to the pressure receiving face, a through hole 211 is formed on the fixed side wall 202 at an inner circumferential side. The through hole 211 is shown in FIG. 4 in an enlarged scale. Likewise, in order to introduce an oil pressure for engaging the lockup clutch 26 from the aforementioned one-way clutch 15 side, another through hole 212 is formed on the hub 19 at the inner circumferential side.

Additionally, a tension spring may be arranged between the movable side wall 205 and the fixed side wall 202. In this case, the load for clamping the rolling member 25 between the movable side wall 205 and the fixed side wall 202 can be assisted by pulling the movable side wall 205 toward the fixed side wall 202. As described, the rolling member 25 is clamped between the inner face of the movable side wall 205 and the inner face of the fixed side wall 202. Therefore, at least one of those inner faces of the side walls 205 and 202 may be formed of a high frictional member.

Specifically, in the vibration damping device shown in FIGS. 3 and 4, the oil pressure for engaging the lock up clutch 26 with the front cover 6 is applied to the pressure receiving face of the movable side wall 205 through the through holes 211 and 212. In this situation, the movable side wall 205 is moved away from the fixed side wall 202 (i.e., toward the left side in FIG. 3). As a result, a clearance between the movable side wall 205 and the fixed side wall 202 is widened so that the rolling member 25 is unlocked. In this situation, therefore, the rolling member 25 is allowed to move in the holding chamber 24 and the torsional vibrations are damped by the movement of the rolling member 25. To the contrary, in case the engine load is increased for example, the lock up clutch 26 is disengaged from the front cover 6. In this case, the oil pressure for engaging the lockup clutch 26 is no longer applied to the movable side wall 205. As a result, the movable side wall 205 is moved toward the fixed side wall 202 and the rolling member 25 is clamped therebetween. Therefore, even if the rotational speed of the turbine runner 5 is varied temporarily, the rolling member 25 will not move in the holding chamber 24 so that the noise resulting from the movement of the rolling member 25 can be suppressed. In addition, as the example shown in FIGS. 1 and 2, the structure of the vibration damping device can also be simplified without loosing required vibration damping capacity.

Here, the present invention can be applied to a hydraulic transmission comprising a drive side impeller, a driven side impeller and a lockup clutch. That is, the present invention can also be applied to hydraulic transmissions other than the torque converter capable of amplifying the torque. In addition, a fundamental requirement for the movable member is to be actuated to unlock the rolling member by the oil pressure for engaging the lockup clutch. Therefore, the rolling member, the holding chamber and the movable member are not necessarily arranged inside of the hydraulic transmission.

The invention claimed is:

1. A vibration damping device for damping torsional vibrations of a rotary member of a hydraulic transmission, in which the rotary member is rotated integrally with a drive side impeller creating a flow of fluid or with a driven side impeller driven by the created flow of the fluid, and in which the drive side impeller and the driven side impeller are connected with a lockup clutch actuated by fluid pressure, comprising:

a holding chamber, which is rotated integrally with the driven side impeller;

a rolling member held in the holding chamber, wherein the rolling member is rotated in a rotational direction of the driven side impeller but allowed to rotate relative to the driven side impeller; and a movable member, which is configured to lock the rolling member in the holding chamber when actuated by the fluid pressure for disengaging the lockup clutch, and to unlock the rolling member in the holding chamber when actuated by the fluid pressure for engaging the lockup clutch.

2. The vibration damping device as claimed in claim 1, wherein:

a surface of the movable member for pushing the rolling member is formed of high frictional member.

3. The vibration damping device as claimed in claim 1, wherein:

the lockup clutch is arranged in the hydraulic transmission in a manner to reciprocate along a common rotational axis of the drive side impeller and the driven side impeller;

a housing in which the holding chamber is formed is arranged to be opposed to the lockup clutch, and to be rotated integrally with the driven side impeller; and the movable member forms a side face of the holding chamber being opposed to the lockup clutch while being connected therewith.

4. The vibration damping device as claimed in claim 1, wherein:

the drive side impeller and the driven side impeller are arranged coaxially while being opposed to each other, and a covering member covering the driven side impeller from an outer circumferential side is connected integrally with the drive side impeller;

the lockup clutch is arranged between the driven side impeller and the covering member coaxially with the driven side impeller while being opposed to an inner face of the covering member;

the housing in which the holding chamber is formed is arranged in the covering member in a manner to rotate integrally with the driven side impeller;

the movable member forms a side face of the holding chamber; and the movable member is moved in a direction to unlock the rolling member by the fluid pressure pushing the lockup clutch onto the inner face of the covering member thereby engaging the lockup clutch with the covering member.

5. The vibration damping device as claimed in claim 4, wherein:

a surface of the movable member for pushing the rolling member is formed of high frictional member.

6. The vibration damping device as claimed in claim 3, wherein:

a surface of the movable member for pushing the rolling member is formed of high frictional member.

7. The vibration damping device as claimed in claim 3, wherein:

the drive side impeller and the driven side impeller are arranged coaxially while being opposed to each other, and a covering member covering the driven side impeller from an outer circumferential side is connected integrally with the drive side impeller;

the lockup clutch is arranged between the driven side impeller and the covering member coaxially with the driven side impeller while being opposed to an inner face of the covering member;

the housing is arranged between the driven side impeller and the lockup clutch coaxially with the driven side impeller and the lockup clutch; and the movable member is moved together with the lockup clutch toward the inner face of the covering member thereby unlocking the rolling member, in case the lockup clutch is being pushed onto the inner face of the covering member to be engaged therewith by the fluid pressure.

8. The vibration damping device as claimed in claim 7, wherein:

a surface of the movable member for pushing the rolling member is formed of high frictional member.

* * * * *